United States Patent
Golas et al.

(10) Patent No.: US 10,403,025 B2
(45) Date of Patent: Sep. 3, 2019

(54) AUTOMATED GRAPHICS AND COMPUTE TILE INTERLEAVE

(71) Applicant: Samsung Electronics Co., Ltd., Suwon-si, Gyeonggi-do (KR)

(72) Inventors: Abhinav Golas, San Bruno, CA (US); Michael Fertig, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/128,449

(22) Filed: Sep. 11, 2018

(65) Prior Publication Data
US 2019/0005703 A1    Jan. 3, 2019

Related U.S. Application Data

(63) Continuation-in-part of application No. 14/981,395, filed on Dec. 28, 2015, now Pat. No. 10,089,775.

(60) Provisional application No. 62/171,071, filed on Jun. 4, 2015.

(51) Int. Cl.
*G06T 15/00* (2011.01)
*G06T 1/20* (2006.01)
*G06T 1/60* (2006.01)

(52) U.S. Cl.
CPC .............. *G06T 15/005* (2013.01); *G06T 1/20* (2013.01); *G06T 1/60* (2013.01); *G09G 2360/123* (2013.01)

(58) Field of Classification Search
None
See application file for complete search history.

(56) References Cited

U.S. PATENT DOCUMENTS

| | | | |
|---|---|---|---|
| 5,835,096 A | 11/1998 | Baldwin | |
| 6,268,875 B1 | 7/2001 | Duluk, Jr. et al. | |
| 7,159,212 B2 * | 1/2007 | Schenk | G06T 15/00 717/146 |
| 7,928,989 B1 * | 4/2011 | Brown | G06T 15/04 345/501 |
| 8,130,223 B1 | 3/2012 | Danskin | |
| 8,736,607 B1 | 3/2014 | Fishwick | |
| 8,810,587 B2 | 8/2014 | Harris et al. | |
| 8,843,880 B2 * | 9/2014 | Carey | G06F 8/30 711/170 |
| 8,902,228 B2 | 12/2014 | Kallio et al. | |
| 8,976,177 B2 | 3/2015 | Nysted et al. | |
| 2003/0067468 A1 | 4/2003 | Duluk, Jr. et al. | |

(Continued)

OTHER PUBLICATIONS

Extended European Search Report for corresponding EP 16172382.0 dated Oct. 20, 2016 (9 pages).

(Continued)

*Primary Examiner* — Robert T Craddock
(74) *Attorney, Agent, or Firm* — Lewis Roca Rothgerber Christie LLP

(57) ABSTRACT

There is provided a method of a graphics processing system, the method including receiving dependency information for a set of interdependent images indicating a dependency across one or more compute shader and graphics workloads, and interleaving processing of the compute shader and graphics workloads for the set of interdependent images in accordance with the dependency information without recompiling a compute shader generating the one or more compute shader workloads.

20 Claims, 8 Drawing Sheets

(56) References Cited

U.S. PATENT DOCUMENTS

| | | |
|---|---|---|
| 2003/0222870 A1 | 12/2003 | Driemeyer et al. |
| 2004/0080512 A1 | 4/2004 | McCormack et al. |
| 2009/0288096 A1 | 11/2009 | El-Mahdy et al. |
| 2011/0050716 A1 | 3/2011 | Mantor et al. |
| 2011/0148919 A1 | 6/2011 | Heggelund et al. |
| 2013/0069943 A1 | 3/2013 | Kallio et al. |
| 2013/0229419 A1 | 9/2013 | Harris et al. |
| 2013/0235057 A1 | 9/2013 | Licea-Kane |
| 2013/0293546 A1 | 11/2013 | Lee et al. |
| 2014/0098887 A1 | 4/2014 | Sermadevi et al. |
| 2014/0306971 A1 | 10/2014 | Frascati et al. |
| 2014/0327671 A1 | 11/2014 | Nystad et al. |

OTHER PUBLICATIONS

Zhang, et al., "A Permutation-based Page Interleaving Scheme to Reduce Row-buffer", Conflicts and Exploit Data Locality, Dec. 2010, pp. 1-10.

* cited by examiner

AUTOMATED GRAPHICS AND COMPUTE TILE INTERLEAVE

CROSS-REFERENCE TO RELATED APPLICATION(S)

This application is a continuation-in-part application of U.S. application Ser. No. 14/981,395, filed Dec. 28, 2015, which claims priority to and the benefit of U.S. Provisional Application No. 62/171,071, filed on Jun. 4, 2015, all of which are incorporated herein by reference.

FIELD

An embodiment of the present invention is generally related to rendering of graphical images in which a graphics renderer and a compute shader is utilized. More particularly, an embodiment of the present invention is directed to interleaving graphics rendering operations and compute shader operations.

BACKGROUND

Graphical images are often generated in several steps. For example, an image may be created and then read to create another image through a sequence of render targets (RTs). The RT is an intermediate memory surface to which a 3D image is rendered. A sequence of steps may be performed to create RT "A" and then read RT A to create RT "B". For example one possibility is to render an image by first writing lighting parameters into a G-buffer and, in a second step, rendering the lit image by reading the G-buffer and doing the light calculations. It is possible for a sequence of operations to be performed on different RTs before a final output image is generated.

However, these render target steps require a graphics processing unit (GPU) to access to external memory. Consider a graphics application that produces an intermediate image A, and then reads image A to produce image B. Given common image sizes (e.g., 1920×1080 pixels), and assuming the pixel is 4 bytes (RGBA8888 format), the intermediate image would have to be written to external memory if the cache cannot store 8 MB of data.

Thus a graphics processor may render all of a first RT (e.g., RT A), write it to an external memory, and then read it from external memory to create a second RT (RT B).

SUMMARY

According to one embodiment, there is provided a method of a graphics processing system, the method including receiving dependency information for a set of interdependent images indicating a dependency across one or more compute shader and graphics workloads, and interleaving processing of the compute shader and graphics workloads for the set of interdependent images in accordance with the dependency information without recompiling a compute shader generating the one or more compute shader workloads.

The dependency information may be received from an application generating graphics or compute workloads via a defined API, or is generated automatically without human intervention.

The dependency information may indicate a ratio of a number of workgroups in a compute-tile of a compute workload to a number of graphics-tiles of a graphics workload, or a ratio of a number of graphics-tiles of a graphics workload to a number of compute-tiles of a compute workload.

The set of interdependent images may correspond to a same frame.

The interleaving processing of the compute shader and graphics workloads may be performed on a tile-by-tile basis for the set of interdependent images.

A compute-tile corresponding to a compute shader workload may include a matrix of workgroups that are an integral number of a graphics-tile corresponding to a graphics workload along each dimension of the compute-tile.

The method may further include scheduling either a first graphics operation or a first compute shader operation followed by scheduling either a second graphics operation or a second compute shader operation, wherein the second graphics operation or the second compute shader operation depends on one or more graphics operations or compute shader operations including the first graphics operation or the first compute shader operation, wherein a block in a graphics operation comprises a block of graphics tiles, and wherein a block in a compute shader operation comprises a block of workgroups.

According to another embodiment, there is provided a non-transitory computer readable medium having computer code that, when executed on a processor, implements a method including receiving dependency information for a set of interdependent images indicating a dependency across one or more compute shader and graphics workloads, and interleaving processing of the compute shader and graphics workloads for the set of interdependent images in accordance with the dependency information without recompiling a compute shader generating the one or more compute shader workloads.

The dependency information may be received from an application generating graphics or compute workloads via a defined API, or is generated automatically without human intervention.

The dependency information may indicate a ratio of a number of workgroups in a compute-tile of a compute workload to a number of graphics-tiles of a graphics workload, or a ratio of a number of graphics-tiles of a graphics workload to a number of compute-tiles of a compute workload.

The set of interdependent images may correspond to a same frame.

The interleaving processing of the compute shader and graphics workloads may be performed on a tile-by-tile basis for the set of interdependent images.

A compute-tile corresponding to a compute shader workload may include a matrix of workgroups that are an integral number of a graphics-tile corresponding to a graphics workload along each dimension of the compute-tile.

The method may further include scheduling either a first graphics operation or a first compute shader operation followed by scheduling either a second graphics operation or a second compute shader operation, wherein the second graphics operation or the second compute shader operation depends on one or more graphics operations or compute shader operations including the first graphics operation or the first compute shader operation, wherein a block in a graphics operation comprises a block of graphics tiles, and wherein a block in a compute shader operation comprises a block of workgroups.

According to another embodiment, there is provided a graphics processing system including a graphics renderer configured to generate graphics workloads, a compute shader configured to generate compute shader workloads, and an interleaved scheduling module configured to interleave processing of the compute shader and graphics workloads for a set of interdependent images in accordance with dependency information for the set of interdependent images indicating a dependency across one or more of the compute shader and graphics workloads without recompilation of the compute shader.

The dependency information may indicate a ratio of a number of workgroups in a compute-tile of a compute workload to a number of graphics-tiles of a graphics workload, or a ratio of a number of graphics-tiles of a graphics workload to a number of compute-tiles of a compute workload.

The set of interdependent images may correspond to a same frame.

The interleaved scheduling module may be configured to interleave processing of the compute shader and graphics workloads on a tile-by-tile basis for the set of interdependent images.

A compute-tile corresponding to a compute shader workload may include a matrix of workgroups that are an integral number of a graphics-tile corresponding to a graphics workload along each dimension of the compute-tile.

The graphics processing system may further include a scheduler configured to schedule either a first graphics operation or a first compute shader operation followed by scheduling either a second graphics operation or a second compute shader operation, wherein the second graphics operation or the second compute shader operation depends on one or more graphics operations or compute shader operations including the first graphics operation or the first compute shader operation, wherein a block in a graphics operation comprises a block of graphics tiles, and wherein a block in a compute shader operation comprises a block of workgroups.

DETAILED DESCRIPTION

Figure 1:
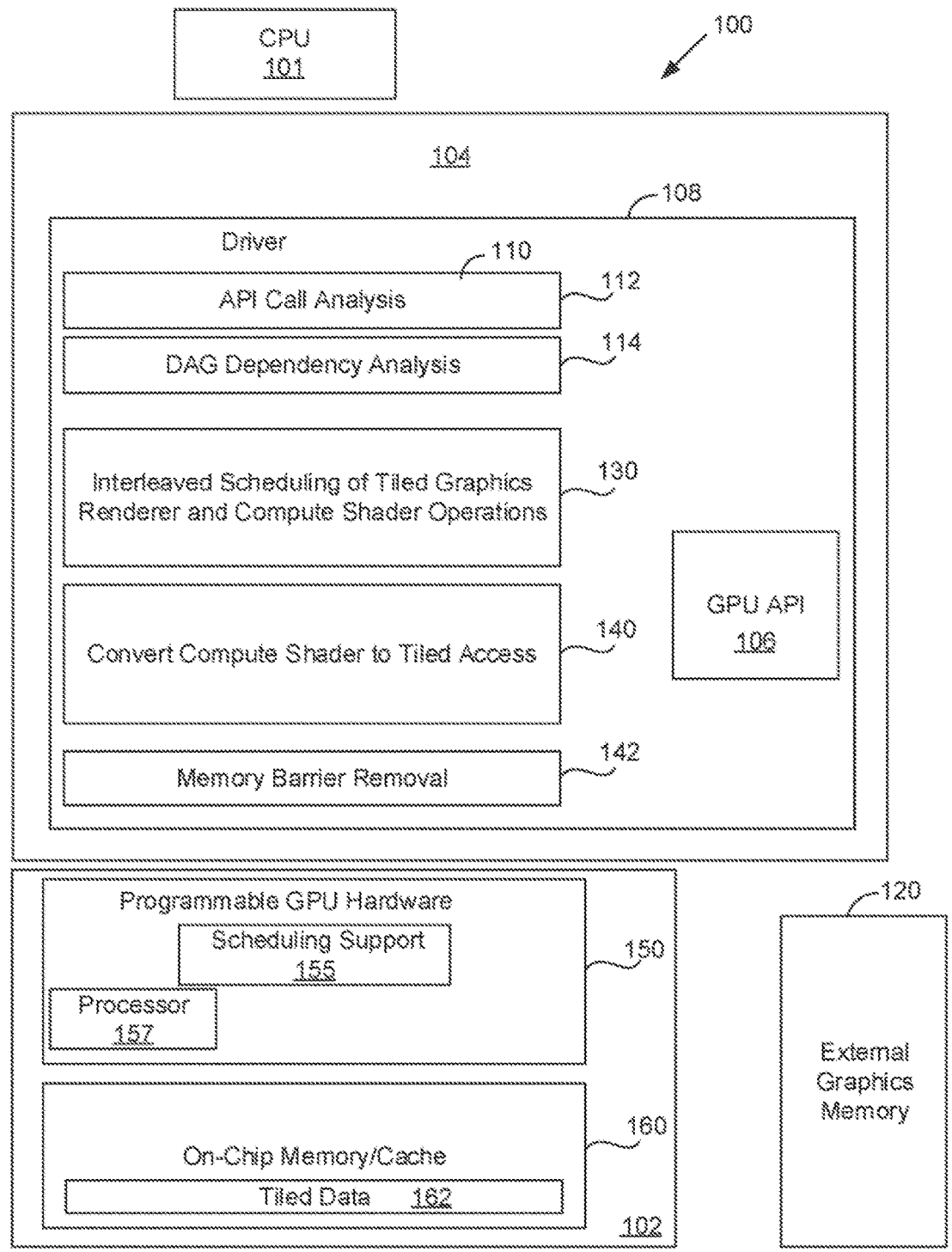
FIG. 1 illustrates a graphics system in accordance with an embodiment.

Features of the inventive concept and methods of accomplishing the same may be understood more readily by reference to the following detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 illustrates a graphics processing system 100 having a central processing unit 101 and a driver 108 stored on a memory 104. For example, the driver 108 can correspond to program instructions that provide a software interface to a graphics processing unit (GPU) 102 that enables software programs (e.g., an operating system program, an application program, and/or the like software programs) to access hardware functions of the GPU 102 and to communicate data with the GPU 102. The driver 108 can support physical and/or virtual hardware.

In one embodiment, the driver 108 includes program instructions stored in memory 104. The graphics processing unit (GPU) 102 includes programmable GPU hardware 150, at least one processor 157, and an on-chip cache memory 160, which may be utilized as a tile buffer to buffer tiled data 162. The driver 108 includes a GPU API 106. While the GPU 102 is described herein as a physical GPU component, it will be appreciated that the GPU 102 can correspond to a virtual GPU.

The GPU 102 has access to an external memory 120. However, it is desirable, in some situations, to reduce memory traffic to and from the external memory 120, such as an external dynamic random access memory (DRAM). For example, when a graphics processor renders a first RT, writes it to an external memory, and then reads it from external memory to create a second RT, this processing can create a lot of traffic to and from the external memory. Additionally, this process can also include rendering of unnecessary portions of intermediate images.

In one embodiment, support is provided in the driver 108 to interleave graphics rendering operations and compute shader operations to maintain intermediate results or data on-chip and to reduce the number of accesses to the external memory 120. Portions of the programmable GPU hardware 150 may be optionally modified with hardware scheduling support 155 to optimize the execution of the interleaved scheduling in the GPU 102.

Graphics rendering operations are performed in a graphics pipeline, which may have fixed function logic, in one or more types of graphics renderers, and also in compute shaders. A graphics renderer is a program that is used to do shading (and hence is sometimes described by the term "graphics shader"). A graphics renderer is a program that runs as part of a graphics rendering operation. A graphics renderer processes pixels, vertices, patches, or primitives. A compute shader is a program used for computing arbitrary information and provides more flexibility. With the addition of compute shader support to the OpenGL-ES™ 3.1 Application Programming Interface (API), benchmarks are moving image post-processing operations, such as motion blur, depth of field, scaling, and filtering, from graphics renderers to compute shaders. In the OpenGL™ standards, a compute shader is a shader that is used for computing arbitrary information. That is, a compute shader operates in a space that is largely abstract. However, a compute shader may have limitations on a workgroup size (i.e., a smallest number of compute operations to be acted upon by a compute-tile) and a local size (which defines a number of invocations of the compute shader that will take place within each workgroup). OpenGL™ also defines rules for shared variables and memory barriers. Memory barriers ensure that all memory transactions before a barrier must complete before proceeding.

Compute shaders offer a greater flexibility and features that can improve the efficiency of post-processing operations. For example, the compute shader gives more freedom in how data is accessed or written. However, the API does not guarantee memory consistency without the use of a global memory barrier (e.g., a glMemoryBarrier).

Figure 2A:
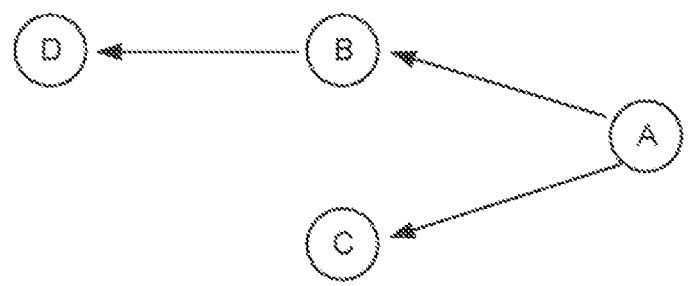
FIG. 2A illustrates a directed acyclic graph in accordance with an embodiment.
Figure 2B:
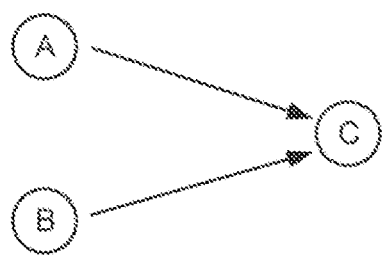
FIG. 2B illustrates a directed acyclic graph in accordance with an embodiment.
Figure 2C:
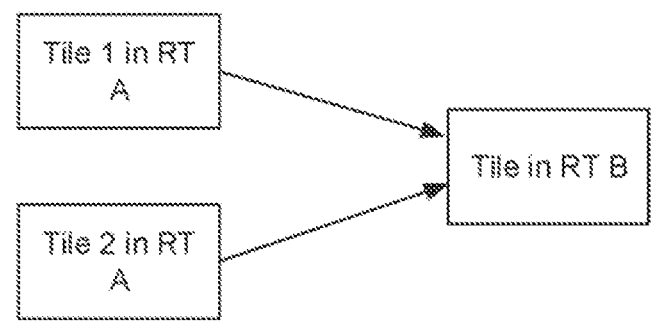
FIG. 2C illustrates a directed acyclic graph in accordance with an embodiment.

An Application Programming Interface (API) call analysis module 112 analyzes API graphics renderer calls and compute shader calls. The API call analysis module 112 is used by a directed acyclic graphic (DAG) dependency analysis module 114 to construct a DAG that defines dependencies between images and tiles, as illustrated in FIGS. 2A, 2B, and 2C. At run time, an API dependency graph (corresponding to a DAG) is built up in the driver 108 to detect cases where graphics and compute calls can be interleaved. API calls are grouped to build a sequence of interleaved execution of graphics rendering operations and compute shader operations, as described in greater detail in connection with FIG. 4.

An interleaved scheduling module 130 determines a schedule of interleaved operations. In one embodiment, at the shader compilation time, the data access pattern of image load/store operations in the compute shader(s) are analyzed to determine if they are candidates for interleaving. Certain types of data access patterns have characteristics that are compatible with interleaving. In one embodiment, if the data access pattern is a statically known strided pattern in 1D or 2D space, the compute shader is a candidate for interleaving. A strided pattern has a sequence of memory accesses to addresses separated from each other by a stride length. A compute shader with a statically known strided pattern has an order of processing that has some general similarities in shape to a tile pattern, which facilitates converting a compute shader to have a tiled access. However, in principle other types of data access patterns may be suitable candidates for interleaving. Operations of the interleaved scheduling module are described in greater detail in FIGS. 3, 4, and 7.

In one embodiment, the interleaved scheduling module 130 determines sets of interleaved tiled graphics renderer and compute shader operations on interdependent render targets (RTs) to reduce external memory traffic by maintaining at least some intermediate results of the interleaved operations in the on-chip cache memory 160. An example of the operation of scheduling interleaved tiled graphics renderer and compute shader operations on interdependent render targets to reduce external memory traffic is illustrated in more detail in FIG. 3.

In one embodiment, support is provided in the driver 108 and a compiler to automatically convert compute shader(s) to operate with a tiled access pattern by converting a compute shader to a tiled version in a convert-compute-shader-to-tiled-access module 140. Compute shaders are converted to operate on tiles by generating a tiled equivalent version. This may include recompiling, using the compiler, the compute shader to adapt the compute shader to perform a tiled memory access in a tile format compatible with that of the tiled memory access of a graphics renderer. In one embodiment, this includes redefining the workgroup-dimension of the compute shader to be an integer divisor of a tile's width and height. Additionally, image load instructions may be replaced with tile buffer load instructions. Memory barrier removal may also be performed, if feasible, for the interleaved graphics and compute operations by memory barrier removal module 142.

In one embodiment, converting a compute shader program to a tiled version results in splitting the compute shader program into multiple instances, corresponding to one instance per tile. As an example, suppose that originally one command to the hardware is required to kick off the complete compute shader operation. For the tiled equivalent, one kickoff command may then be required for each tile generated by the compute shader.

In one embodiment, the graphics system automatically (e.g., without human intervention) interleaves the processing of graphics rendering and compute shaders in order to reduce or eliminate writing and reading intermediate data to the external (off-chip) memory. The driver 108 reorders the API calls and performs any necessary recompiling of the compute shaders through the driver (and the support of a compiler software stack) to process existing applications written in graphics APIs having compute shaders.

Referring to FIG. 2A, in one embodiment a data flow graph (or equivalent data structure) is generated by DAG dependency analysis module 114 that shows that the immediate dependency between a set of two or more images, such as image A and B, and may also include other subsequent images (e.g., C, D). FIG. 2A corresponds to a DAG defining dependencies between different render targets (RTs). The interdependence of different RT images may be simple (e.g., image B directly flows from image A) or it may be have more complex interdependent relationships (e.g., an image may depend on more than one image). More generally, one or more images might depend on several others at the same time, such as A+B being used to generate C, as illustrated in FIG. 2B. Thus, while there may be a simple sequence of one RT feeding (e.g., used as input) into another RT, more generally the interdependence may be more complex. For example two graphics RTs may be required to generate a compute shader RT. Additionally, the dependency at a tile level may also be complex. For example, referring to FIG. 2C, a tile in a given image B may depend on more than one tile in a previous image. Additionally, there may be individual tiles in a given RT that are not used by any tiles in a subsequent RT.

In one embodiment, the API call analysis module 112 and DAG dependency analysis module 114 of the driver 108 examines a stream of commands, and then determines if the image of RT B directly or indirectly (e.g., downstream) depends on RT A. In response to a determination that RT B does depend on RT A, the driver 108 determines how many levels of the dependency graph (e.g., an API dependency graph corresponding to a DAG) should be followed to reduce external memory accesses. Following every level of the dependency graph may not be required in all cases to achieve a reduction in external memory accesses. Moreover, following every level of a complex dependency graph consumes processing resources. Thus, an example embodiment of the DAG dependency analysis module 114 limits how many levels of the dependency graph are followed. If the dependency graph is complex, a rule that may be applied may limit the number of levels of the dependency graph that is followed. An interleaving schedule is then generated by the interleaved scheduling module 130 to attempt to keep intermediate results in on-chip cache memory (e.g., a tile buffer).

Additionally, in an example embodiment, the DAG maps dependencies at a tile level between tiles rendered by graphics rendering operations and tiles operated on by compute shaders. The generation of the DAG may include back-projecting each output tile to the input tile(s) used to generate them. As an example, suppose as in FIG. 2A that image A is used to produce image B, which in turn is used to produce image D. There is a dependency of images and a dependency of tiles from the images. For example, a single tile in a given image may depend on more than one tile from another image, as illustrated in FIG. 2C.

Figure 3:
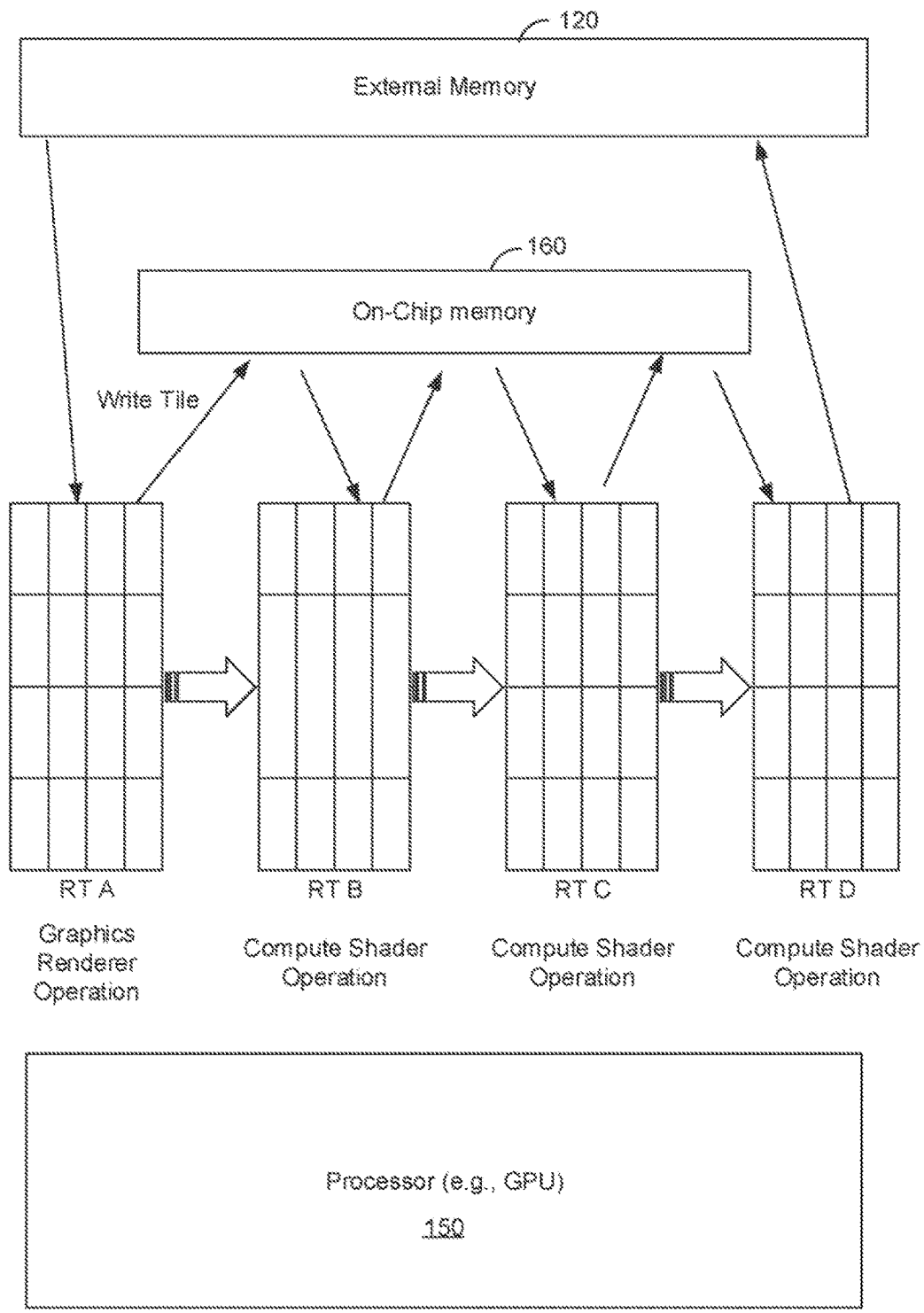
FIG. 3 illustrates maintaining intermediate results in on-chip memory in accordance with an embodiment.

FIG. 3 illustrates an example in which the intermediate computations of a sequence of operations are maintained in the on-chip cache memory 160 utilized as a tile buffer. In this example, the DAG dependency analysis module 114 determines dependencies between RT A, RT B, RT C, and RT D. Interleaved scheduling module 130 determines a schedule to write tiles of RT A to the on-chip cache memory 160 and to then read them to generate RT B. The scheduling of the processing of the tile read and write operations may be selected to generate an interleaved schedule such that after a tile of image A is produced and stored to on-chip cache memory 160, that tile is "immediately read back" to produce a tile of RT B, thus saving memory bandwidth. It will be appreciated that "immediately read back" (also referred to as "directly consumed" or "consumed immediately") can include processing intervening operations between the storing of the tile of image A to on-chip cache memory 160 and the reading of the stored tile from the on-chip cache memory to produce a tile of RT B. For example, "immediately read back" can correspond to reading the tile of image A from the on-chip cache memory 160 rather than reading the tile from external memory 120 to produce the tile of RT B.

The interleaved schedule may proceed in an order consistent with the dependency analysis performed by DAG dependency analysis module 114 that is selected to optimize use of the on-chip cache memory 160, and may thus reduce or minimize the need to use external memory 120 for the intermediate computations. Additionally, in one embodiment the dependency analysis performed by DAG dependency analysis module 114 may be used in the scheduling scheme to eliminate performing processing on tiles that do not contribute to a tile of a final image, thus eliminating unneeded work. After a sequence of intermediate operations are performed, a final image is rendered that may be sent to the external memory 120 or that may be output for display. While completely maintaining all intermediate results on chip is desirable, more generally it will be understood that even maintaining a subset of intermediate data results on chip is beneficial in reducing the number of external memory accesses that are required to perform graphics processing. Further, it is possible to reduce tile sizes to reduce or minimize the amount of intermediate data that must be maintained, which allows for an even finer grain of interleaving.

In one embodiment, interleaving is performed at the tile level for graphics rendering and compute shader operations on a set of producer/consumer render targets (e.g., from images 1, 2, 3) so that tile data for RT1 is rendered just before it is required to generate the corresponding tile of RT2 with the tiled compute shader, which is rendered just before that portion of RT2 is required to generate RT3, and so on. Alternatively, a compute shader might generate input data required to render a graphics-tile. For example, a compute shader might generate a position of particles, and there may be only one particle affecting a specific XY region that is of interest for the graphics renderer.

Figure 4:
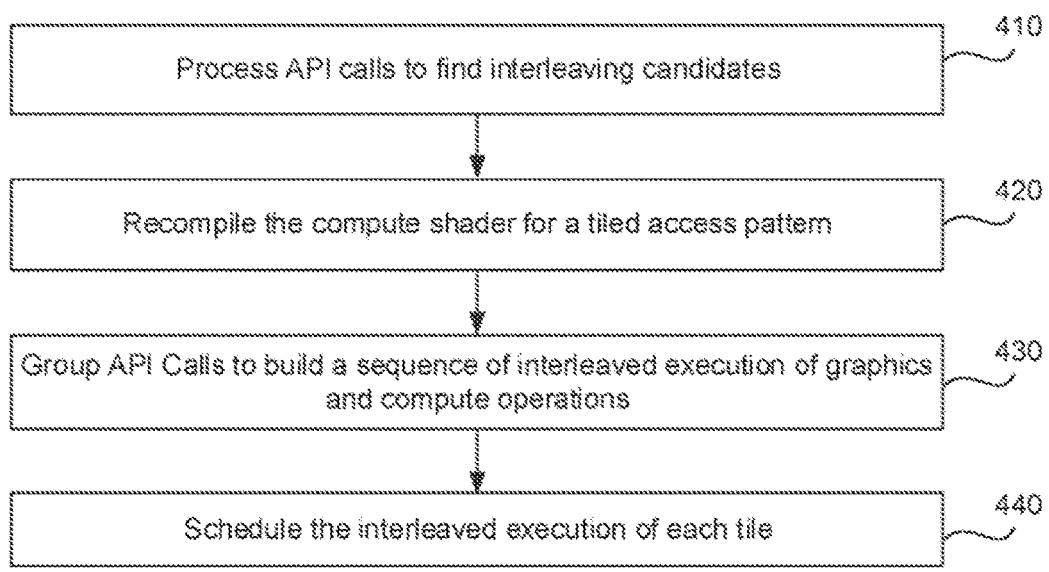
FIG. 4 is a flowchart of a method in accordance with an embodiment.

FIG. 4 shows a flowchart of an embodiment to interleave graphics and compute operations. In block 410, the API call analysis module 112 processes API calls to find interleaving candidates. API call processing is deferred and queued to build a directed acyclic graphic (DAG) by DAG dependency analysis module 114 that defines dependencies. In a tile-based deferred rendering (TBDR) processing for a graphics only workload, the driver 108 uses certain events, such as render target change or memory barrier, to determine when to start processing deferred API calls. In the case where graphics and compute calls are mixed, the memory barrier removal module 142 determines whether one or more memory barriers can be safely removed by interleaving the graphics with compute calls in a tiled manner (e.g., as one illustrative example, the memory barrier is safe to remove if the graphics processing for the tile will end before the compute processing occurs). In one implementation, a determination of when interleaving is allowed is based on an analysis of memory access patterns of image load/store operations in the compute shader at compilation time. If the memory access pattern is statically-known strided pattern in 1D or 2D space, then the compute shader is a candidate for interleaving.

In block 420, the convert-compute-shader-to-tiled-access module 140 recompiles the compute shader for tiled access patterns. In one embodiment the workgroup-dimension of the compute shader is redefined to be an integer divisor of a tile's width and height. Alternately or in addition, the tile's width and height can also be modified. These modifications ensure that the range of access fits with the defined tile dimensions, so that all data can stay on chip. In one embodiment, image load instructions are replaced with tile buffer load instructions. This may include replacing instructions used to compute the target address to index in a tile buffer.

In block 430, the interleaved scheduling module 130 groups API calls to build a sequence of interleaved execution of graphics and compute operations. In an example embodiment, the interleaved scheduling module 130 determines whether interleaving is feasible. The interleaved scheduling module 130 removes the memory barrier in a response to a determination that interleaving is feasible.

In block 440, the interleaved scheduling module 130 schedules the interleaved execution of each tile. The output of a graphics renderer for a given tile is stored in on-chip cache memory 160 (or, e.g., other on chip storage such as a data register or buffer). In one embodiment, data is immediately read back by a subsequent compute shader, thereby eliminating the unnecessary external memory accesses.

Figure 5:
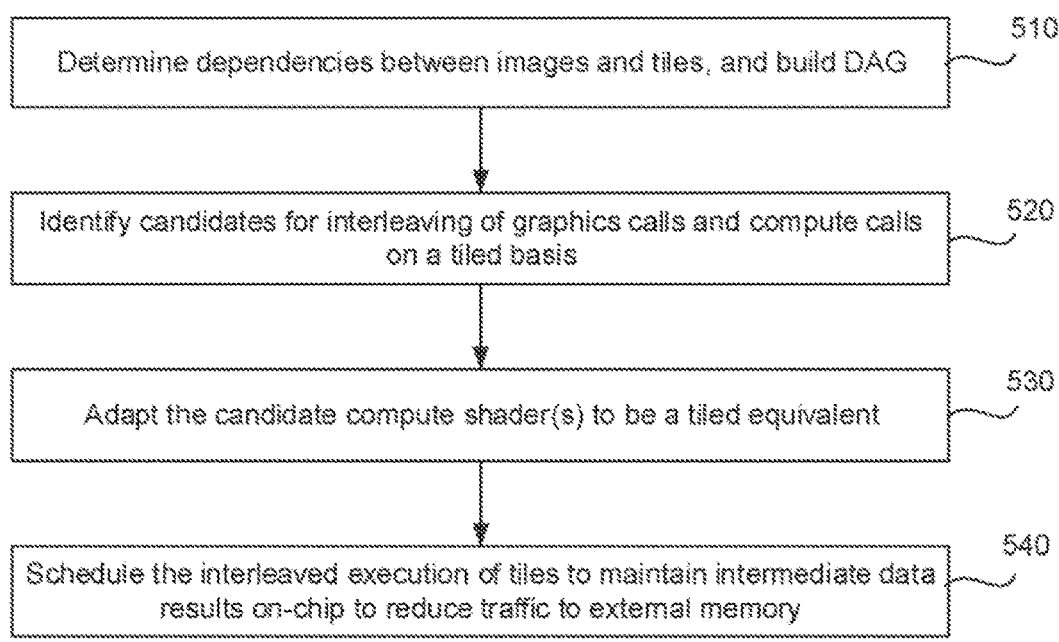
FIG. 5 is a flowchart of a method in accordance with an embodiment.

FIG. 5 illustrates another example of a method of interleaving graphics and compute operations in accordance with an embodiment. Dependencies are determined in block 510 between images and tiles by DAG dependency analysis module 114 in order to build a DAG. Candidates are identified in block 520 for interleaving of graphics calls and compute calls on a tiled basis. For example, the interleaved scheduling module 130 identifies candidates for interleaving. In block 530, the associated candidate compute shader(s) are adapted to be a tiled equivalent having a tiled access pattern by convert-compute-shader-to-tiled-access module 140. For example, the convert-compute-shader-to-tiled-access module 140 recompiles the compute shader for tiled access patterns. In block 540, interleaving of the combined graphics renderer and compute shader operations is scheduled by interleaved scheduling module 130 in a tiled manner to reduce traffic to external memory by maintaining at least some of the intermediate data result in on chip memory (e.g., a tile buffer).

Figure 6:
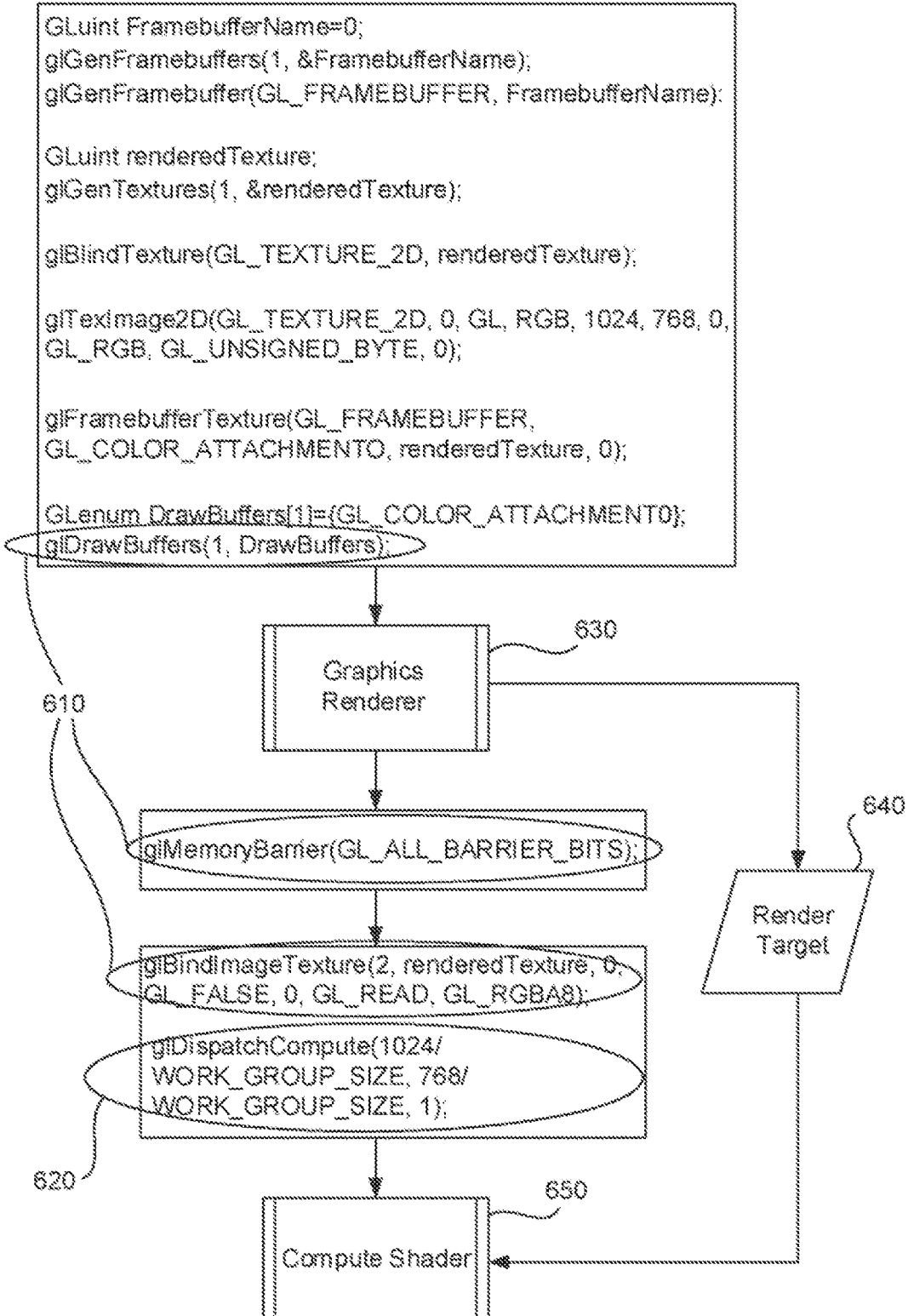
FIG. 6 illustrates an example of analyzing a sequence of API calls for interleaving graphics calls followed by compute calls in accordance with an embodiment.

FIG. 6 shows an example of analyzing a sequence of API calls (e.g., OpenGL™ API calls) for interleaving graphics calls followed by compute calls for a graphics renderer 630 and a compute shader 650. The API call analysis module 112 analyzes the API graphics calls 610 and the API compute calls 620 in order to determine if there are cases where graphics and compute calls can be interleaved. When the compute call 620 is encountered, the DAG dependency analysis module 114 determines the graphics calls on which the compute call is dependent. The render target 640 is an intermediate memory surface to which a 3D image is rendered.

Figure 7:
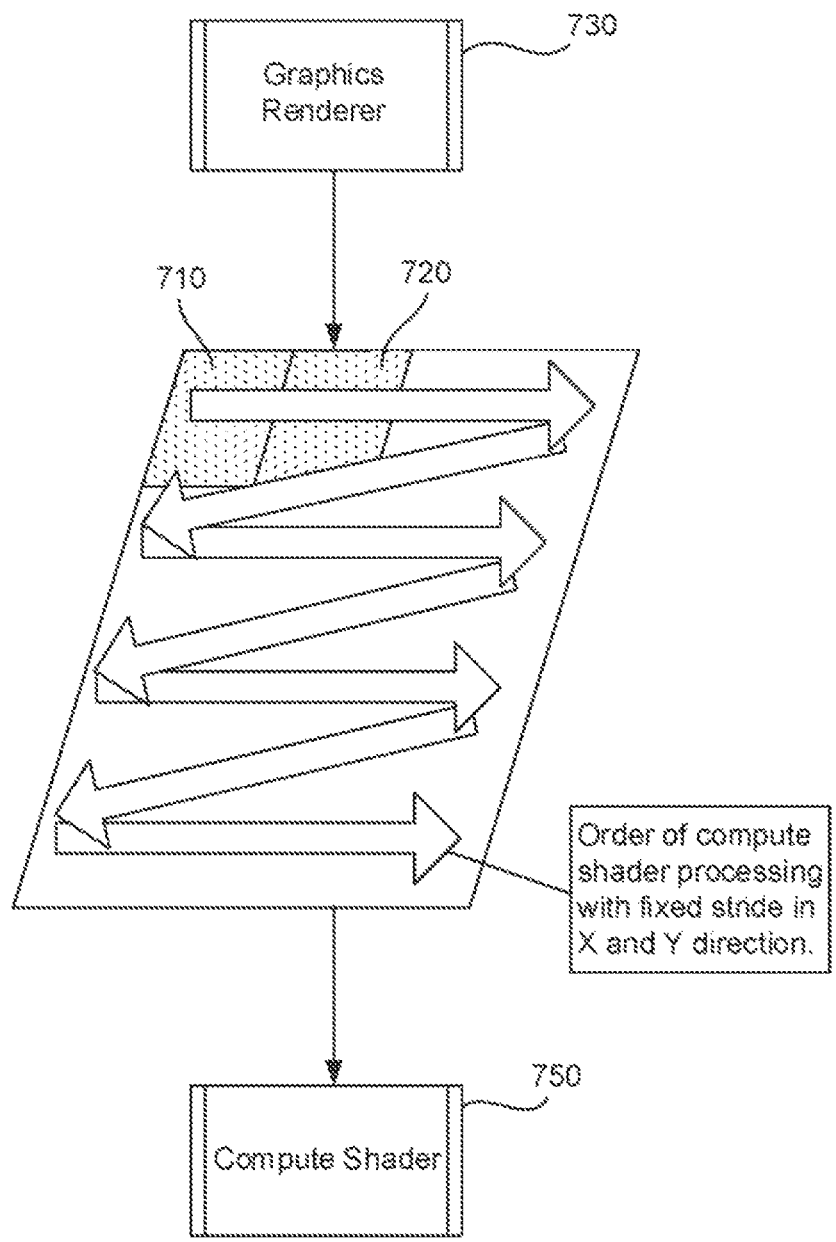
FIG. 7 illustrates the interleaving of the graphics and compute calls in accordance with an embodiment.

FIG. 7 shows an example of the interleaving of the graphics and compute calls by the interleaved scheduling module 130 in accordance with an embodiment. The stride pattern followed by the compute shader can be determined by looking at the memory access patterns of the load/store operations of the compute shader 750. The graphics renderer 730 will produce the tile in the order in which the compute shader 750 consumes the tile. For example, once a first tile 710 has been produced, then the compute shader 750 processes the first tile 710. While the compute shader 750 processes the tile 710, the graphics renderer 730 produces a second tile 720. Then, after the compute shader 750 processes the second tile 720, the graphics renderer 730 produces another tile. As a result, the processing of the tiles is interleaved between the graphics renderer 730 and a compute shader 750.

As an illustrative example, the rendering of a graphics frame may include a mixture of graphics and compute commands. A graphics rendering engine may mix graphics operations and compute operations for many stages of post-processing and graphics calculations. In particular, without interleaving some stages of processing generate intermediate results that may be written to memory (e.g., external memory) and read back later to generate the next intermediate or final resulting image. As an example scenario, the compute shader operations may include lighting calculations based on parameter data from a G-buffer (generated by graphics rendering operations), motion blur, depth of field (DOF), compositing, and anti-aliasing. By tiling compute shader operations, data production and consumption between graphics and compute operations can be interleaved at the tile level. This permits data to stay in on chip memory, which in some graphics applications may eliminate some or even most traffic to external memory and thus significantly improve power efficiency and performance. Additionally, the automatic (e.g., without human intervention) removal of explicit global memory barriers also improves performance.

In a number of graphics applications a graphics renderer is followed by a sequence of compute shader operations. However, in one embodiment, the compute shader is followed by the graphics renderer. In this embodiment a similar analysis can be applied to a case where the compute shader writes output to external memory and the graphics renderer loads the data from the external memory. The compute shader and graphics renderer can be interleaved by recompiling the compute shader to output the data to the on-chip buffer. The graphics renderer consumes the data from the on-chip buffer, executing in a tiled manner.

In an alternate embodiment, caches are used instead of a tile buffer for intermediate data. In certain architectures, direct access to a low-level on-chip cache being used as tile-buffer may not be possible owing to the lack of appropriate data pathways. In such a case, the nearest cache level can be used instead. However, the energy and performance benefits may be reduced depending on the proximity of the cache to the compute logic within the GPU. If a next-level cache is being used, then several changes can be made. In one embodiment, image load instructions are not changed to tile buffer loads. However, hints or directives may be issued to the cache to ensure that the data remains resident in the cache and is not swapped out to external DRAM memory until the dependent calculations are complete. The range of access is selected to fit within the cache capacity, so all working data can stay in-cache. Additionally, the output of a graphics renderer for a given tile is stored in nearest cache. The data is consumed immediately by a subsequent compute shader, eliminating any unnecessary DRAM or lower cache level access.

Figure 8:
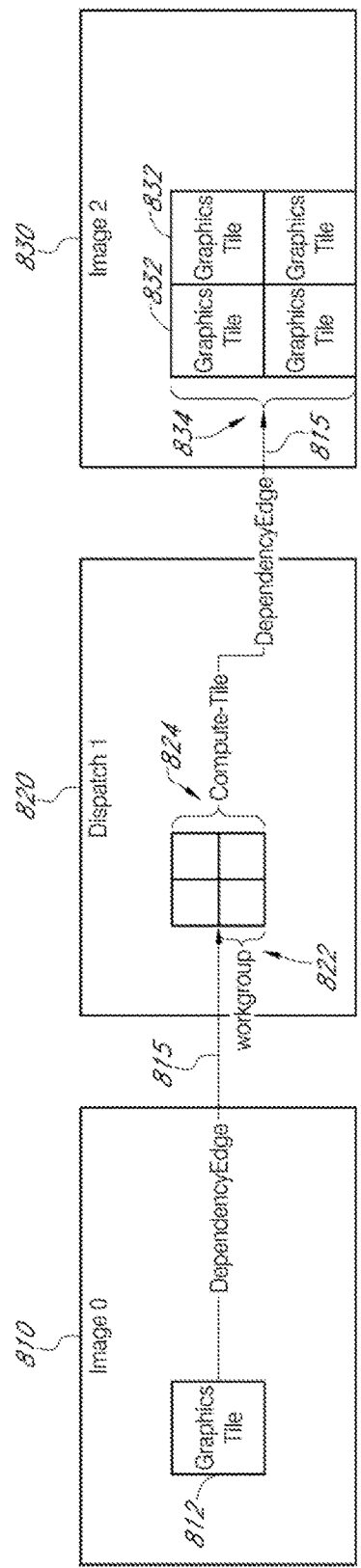
FIG. 8 illustrates a block diagram depicting dependencies between graphics-tiles and compute-tiles in accordance with an embodiment.

FIG. 8 illustrates a block diagram depicting dependencies between graphics-tiles and compute-tiles in accordance with an embodiment.

The methods of interleaving graphics renderer and compute shader operations according to the previously discussed embodiments may cover dependencies across tiles from different interdependent images, which may be within the same frame or may be across different frames in a sequence of frames. For example, if a second image depends on a first image, then a corresponding dependency is expressed at the fine-grained level as follows: tile(x, y) in the second image depends on the first image on a window of tiles centered around (x-a, y-b) where the dimensions of the window of tiles are (c, d) tiles. It should be noted that, as used herein, the term "image" or "images" and similar terms (e.g., "interdependent images") are not limited solely to graphics operations, but may be equally applied to various types of compute operations as well.

Referring to FIG. 8, the present embodiment provides an example of providing dependency information across "Image 0" 810, "Dispatch 1" 820, and Image 2 830, where Image 0 and Image 2 correspond to graphics rendering operations, while "Dispatch 1" corresponds to a compute shader operation. In the present embodiment, Image 0, Dispatch 1, and Image 2 all correspond to the same, single frame.

In the present embodiment, one graphics-tile 812 in Image 0 810 depends on a 2×2 block of workgroups 822 collectively forming a compute-tile 824 in Dispatch 1 820. As used herein, the term "workgroups" corresponds to OpenCL nomenclature for the definition of workgroup The compute-tile 824 in Dispatch 1 820 in turn depends on a 2×2 block 834 of graphics-tiles 832 in Image 2 830. Thus, a hardware scheduler (e.g., the hardware scheduling support 155 of the programmable GPU hardware 150 of FIG. 1) can schedule the 4 graphics-tiles 832 in Image 2 830, followed by the 4 workgroups 822 of the compute-tile 824 from Dispatch 1 820, and then followed by the 1 graphics-tile 812 from Image 0 810, thereby obtaining an improved or maximal/optimal locality of reference, as described below. However, the hardware scheduler is not necessarily restricted by, or required to take any action because of, the various tiles that may be generated. In some embodiments, though, the hardware scheduler may have access to the information corresponding to the tiles, and may use the information in one or more processing operations. Accordingly, the present embodiment may achieve sufficiently fine-grained processing so that tiles can be written to, and read from, an on-chip cache, such as the on-chip memory 160 of FIG. 3, without having to access an external DRAM, such as the external memory 120 shown in FIG. 3, thereby potentially eliminating some traffic to external memory and improving power efficiency and performance of processing operations.

In the present embodiment, a method of compute-graphics interleaving provides a concept of creating a compute-tile 824 from a plurality of existing workgroups 822 (e.g., a matrix of workgroups 822). Each workgroup 822 includes one or more threads (virtual or actual), which work in tandem such that each thread performs a particular task for a single set of inputs, thereby allowing the various threads of the GPU (e.g., the GPU 102 of FIG. 1) to interact and communicate with each other. The compute-tile 824 is an integral number of the workgroups 822 along each dimension of the compute-tile 824 (e.g., along two dimensions for a two-dimensional compute-tile, as in the example shown in FIG. 8). The determined integral number corresponds to the tile(s) (e.g., corresponds to one or more compute-tiles and/or graphics-tiles) on which the compute-tile depends. Also, the determined integral number may be determined by dependency information indicating details regarding dependencies 815 between interdependent operations, the dependency information being accessible to the compute shader and the graphics renderer (e.g., the compute shader 750 and the graphics renderer 730 of FIG. 7). For example, the dependency information may indicate a dependency ratio between the tiles of corresponding graphics renderer and compute shader operations (e.g., a ratio of workgroups to graphics-tiles, or a ratio of graphics-tiles to compute-tiles).

For example, if a workgroup-dimension of the workgroup 822 is M×N (M and N being integers), then a compute-tile-dimension of the compute-tile 824 is (o*M)×(p*N) (o and p being integers), as the compute-tile 824 contains o×p workgroups 822, each workgroup 822 having a workgroup-dimension of M×N. The dependency information may be used to determine integers "o" and "p." Accordingly, the method of the present embodiment can be performed when a dependency granularity can be expressed as an integral multiple of a compute workgroup 822 (e.g., when a dimension of a workgroup 822 of the compute-tile 824 is an integral/integer divisor of a width and height of a graphics-tile 812 depending therefrom), where the dependency granularity may be chosen such that the various graphics-tiles and compute-tiles may be written to, and read from, an on-chip memory without accessing an external memory in a manner similar to the example shown in FIG. 3.

The term "matrix," as used herein, does not necessarily imply a two-dimensional nature, as 1D or 3D matrices may be applied to the embodiments herein if an application is was used to provide dependencies, and may be achieved using automatic dependency computation logic.

It should be noted that the integral dependency may be obtained by rounding real numbers up or down to a corresponding whole number. Accordingly, even if dependencies are rounded off, embodiments of the present invention may still maintain correctness.

Further, it should be noted that various dependency regions of adjacent tiles, whether graphics tiles or compute tiles, may overlap. That is, there may be some respective overlap of dependency regions of two or more interdependent tiles.

It should further be noted that, although the example shown in FIG. 8 indicates that "o" and "p" are both equal to 2, the present embodiment is not limited thereby, and "o" and "p" may instead correspond to different integers in other examples. Also, there may be a logical reduction to 1-dimensional workgroups (e.g., a workgroup of 1×N, or M×1), as it may be possible to create a 2-dimensional compute-tile out of 1-dimensional workgroups. However, 3-dimensional workgroups may be less useful or manageable, as the present embodiment uses an integral number of workgroups 822. It should also be noted that, although FIG. 8 depicts a compute-to-graphics dependency and a graphics-to-compute dependency, there may also be graphics-to-graphics dependencies and compute-to-compute dependencies in accordance with the present embodiment. Further, and in a manner similar to the embodiments discussed above with respect to FIGS. 2A, 2B, and 2C, the various dependencies can be a one-to-one dependency where one tile depends on a single other tile, a one-to-many dependency where many tiles depend on a single tile, or a many-to-one dependency where a single tile depends on two or more other tiles.

In the present embodiment, dependencies 815 can be supplied between respective ones of the graphics-tiles 812, 832 and compute-tiles 824 without modifying graphics work or compute work. The scheduler or hardware scheduler (e.g., the hardware scheduling support 155 of the programmable GPU hardware 150 of FIG. 1) can also then operate at the granularity of the compute-tile 824 for scheduling on the GPU (e.g., the GPU 102 of FIG. 1). Accordingly, an application program or a driver (e.g., the driver 108 of FIG. 1) may use dependency information to express a dependency 815 across compute and graphics workloads/operations with little or minimal additional hardware, and without recompilation of either the compute workload or the graphics workload.

In previously described embodiments, a compute workload may be recompiled so that a dependency ratio of the compute workload matches a finite set of pixel blocks. For example, a GPU (e.g., the GPU 102 of FIG. 1) can render pixel blocks within a range of sizes (e.g., can render an 8×8 block of pixels to a 64×64 block of pixels). However, a compute chain might be defined by 16×16 block of pixels. Accordingly, recompiling the compute workload may make the larger 64×64 block of pixels compatible therewith.

According to an example of the present embodiment, if a graphics renderer (e.g., the graphics renderer 730 of FIG. 7) renders graphics according to 64×64 block of pixels, and if a compute shader (e.g., the compute shader 750 of FIG. 7) performs compute shader processing according to a 16×16 block of pixels, dependency information may indicate that the dependency ratio may be such that one graphics block/graphics-tile, depends on a 4×4 compute block/compute-tile. Because the dependency ratio may be such that the dependency granularity can be expressed as an integral multiple of the compute workgroup size, no recompilation of either workload need be performed to enable the interleaving of the various graphics renderer and compute shader operations/workloads. Furthermore, no accessing of external memory is needed. That is, once a dependency chain of operations is established, the present embodiment enables determination of an improved/near optimal order of the operations such that data from one stage is immediately consumed by another stage, thereby achieving an improved optimal locality of reference to enable rendering of tiles, followed immediately by the consumption of the data corresponding thereto, without going off chip. Although different sizes of blocks/tiles are provided in the present example, these numbers are only used for illustrative purposes, and different numbers may be used by the various embodiments, which are not limited by the present example.

As another example, multiple independent tiles' dependencies may be run in parallel. For example, if tile(a, b) in an image "image0" depends on compute-tile(c,d) in another image "compute1" wherein a 1 to 1 dependency exists, then (c, d) may be run followed by (a, b), or, alternatively, (c, d) may be run, then (c+1, d), then (c, d+1) etc. followed by running (a, b), (a+1, b), etc.

An improved/maximal/near optimal locality of reference corresponds to a size of blocks/tiles that is not too large to be handled by the on-chip cache (e.g., on-chip memory 160 of FIG. 3), and is not too small to fail to take advantage of the on-chip cache's resources, which would needlessly delay graphics and compute processing resources. The improved locality of reference also obviates the need to recompile any workload to enable operation with blocks/tiles that would otherwise be too large.

Accordingly, the present embodiment enables dependencies to be defined such that it is not important whether a pixel block (e.g., a graphics-tile or a compute-tile) will be acted upon by a graphic stage or a compute stage. Further, the dependencies may be defined such that a dependency structure is "size agnostic," and can therefore operate on pixel blocks of different dimensions without any recompilation of any workload, and without accessing external memory.

As used herein, a module can correspond to a hardware component, a software component, or a combination thereof. For example, a module can include one or more processors (e.g., computer processors) and a data storage device including program instruction. The one or more processors can be configured by the instructions to function as a special purpose processor to perform one or more methods described herein. Software, hardware, and other modules may reside on servers, workstations, mobile devices, smart phones, wearable computers, personal computers, tablet computers, image data encoders, image data decoders, PDAs, video projectors, audio-visual receivers, displays (such as televisions), digital cinema projectors, media players, and other devices suitable for the purposes described herein. Those skilled in the relevant art will appreciate that aspects of the system can be practiced as a standalone device or by a system of devices, such as, e.g., a client-server system.

A software (or "program") component may comprise any non-transitory medium which carries a set of computer-readable instructions which, when executed by a processor, cause the processor to execute one or more methods disclosed herein. Software component may be in any of a wide variety of forms. The program component may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable instructions on the program components may optionally be compressed or encrypted.

Example embodiments of software components may include (but are not limited to) firmware, middleware, operating system software, resident software, application software, microcode, and the like. Both hardware and software components may be centralized or distributed (or a combination thereof), in whole or in part, as known to those skilled in the art. For example, software components and other modules may be accessible via local memory, via a network, via a browser or other application in a distributed computing context or via other means suitable for the purposes described above.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or computing devices. In addition, those of ordinary skill in the art will recognize that devices such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. In a graphics processing system, a method comprising:
receiving dependency information for a set of interdependent images indicating a dependency across one or more compute shader and graphics workloads; and
interleaving processing of the compute shader and graphics workloads for the set of interdependent images in accordance with the dependency information without recompiling a compute shader generating the one or more compute shader workloads.

2. The method of claim 1, wherein the dependency information is received from an application generating graphics or compute workloads via a defined API, or is generated automatically without human intervention.

3. The method of claim 1, wherein the dependency information indicates:
a ratio of a number of workgroups in a compute-tile of a compute workload to a number of graphics-tiles of a graphics workload; or
a ratio of a number of graphics-tiles of a graphics workload to a number of compute-tiles of a compute workload.

4. The method of claim 1, wherein the set of interdependent images correspond to a same frame.

5. The method of claim 1, wherein the interleaving processing of the compute shader and graphics workloads is performed on a tile-by-tile basis for the set of interdependent images.

6. The method of claim 1, wherein a compute-tile corresponding to a compute shader workload comprises a matrix of workgroups that are an integral number of a graphics-tile corresponding to a graphics workload along each dimension of the compute-tile.

7. The method of claim 1, further comprising scheduling either a first graphics operation or a first compute shader operation followed by scheduling either a second graphics operation or a second compute shader operation,
wherein the second graphics operation or the second compute shader operation depends on one or more graphics operations or compute shader operations including the first graphics operation or the first compute shader operation,
wherein a block in a graphics operation comprises a block of graphics tiles, and
wherein a block in a compute shader operation comprises a block of workgroups.

8. A non-transitory computer readable medium having computer code that, when executed on a processor, implements a method comprising:
receiving dependency information for a set of interdependent images indicating a dependency across one or more compute shader and graphics workloads; and
interleaving processing of the compute shader and graphics workloads for the set of interdependent images in accordance with the dependency information without recompiling a compute shader generating the one or more compute shader workloads.

9. The non-transitory computer readable medium of claim 8, wherein the dependency information is received from an application generating graphics or compute workloads via a defined API, or is generated automatically without human intervention.

10. The non-transitory computer readable medium of claim 8, wherein the dependency information indicates:
a ratio of a number of workgroups in a compute-tile of a compute workload to a number of graphics-tiles of a graphics workload; or
a ratio of a number of graphics-tiles of a graphics workload to a number of compute-tiles of a compute workload.

11. The non-transitory computer readable medium of claim 8, wherein the set of interdependent images correspond to a same frame.

12. The non-transitory computer readable medium of claim 8, wherein the interleaving processing of the compute shader and graphics workloads is performed on a tile-by-tile basis for the set of interdependent images.

13. The non-transitory computer readable medium of claim 8, wherein a compute-tile corresponding to a compute shader workload comprises a matrix of workgroups that are an integral number of a graphics-tile corresponding to a graphics workload along each dimension of the compute-tile.

14. The non-transitory computer readable medium of claim 8, further comprising scheduling either a first graphics operation or a first compute shader operation followed by scheduling either a second graphics operation or a second compute shader operation,
wherein the second graphics operation or the second compute shader operation depends on one or more graphics operations or compute shader operations including the first graphics operation or the first compute shader operation,
wherein a block in a graphics operation comprises a block of graphics tiles, and
wherein a block in a compute shader operation comprises a block of workgroups.

15. A graphics processing system comprising:
a graphics renderer configured to generate graphics workloads;
a compute shader configured to generate compute shader workloads; and
an interleaved scheduling module configured to interleave processing of the compute shader and graphics workloads for a set of interdependent images in accordance with dependency information for the set of interdependent images indicating a dependency across one or more of the compute shader and graphics workloads without recompilation of the compute shader.

16. The graphics processing system of claim 15, wherein the dependency information indicates:
   a ratio of a number of workgroups in a compute-tile of a compute workload to a number of graphics-tiles of a graphics workload; or
   a ratio of a number of graphics-tiles of a graphics workload to a number of compute-tiles of a compute workload.

17. The graphics processing system of claim 15, wherein the set of interdependent images correspond to a same frame.

18. The graphics processing system of claim 15, wherein the interleaved scheduling module is configured to interleave processing of the compute shader and graphics workloads on a tile-by-tile basis for the set of interdependent images.

19. The graphics processing system of claim 15, wherein a compute-tile corresponding to a compute shader workload comprises a matrix of workgroups that are an integral number of a graphics-tile corresponding to a graphics workload along each dimension of the compute-tile.

20. The graphics processing system of claim 15, further comprising a scheduler configured to schedule either a first graphics operation or a first compute shader operation followed by scheduling either a second graphics operation or a second compute shader operation,
   wherein the second graphics operation or the second compute shader operation depends on one or more graphics operations or compute shader operations including the first graphics operation or the first compute shader operation,
   wherein a block in a graphics operation comprises a block of graphics tiles, and
   wherein a block in a compute shader operation comprises a block of workgroups.

* * * * *